(12) United States Patent
Yin et al.

(10) Patent No.: US 7,833,443 B2
(45) Date of Patent: Nov. 16, 2010

(54) MOLDS FOR PRODUCING CONTACT LENSES

(75) Inventors: Changhong Yin, St. Augustine, FL (US); Scott F Ansell, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 12/342,661

(22) Filed: Dec. 23, 2008

(65) Prior Publication Data

US 2009/0121368 A1  May 14, 2009

Related U.S. Application Data

(60) Division of application No. 11/522,230, filed on Sep. 15, 2006, now abandoned, which is a continuation-in-part of application No. 10/639,823, filed on Aug. 13, 2003, now abandoned, which is a continuation-in-part of application No. 10/395,755, filed on Mar. 24, 2003, now abandoned, which is a continuation-in-part of application No. 10/222,373, filed on Aug. 16, 2002, now abandoned.

(51) Int. Cl.
*B23D 11/00* (2006.01)
*B28B 7/36* (2006.01)
*G02B 1/04* (2006.01)

(52) U.S. Cl. .................. 264/2.5; 264/1.1; 264/337; 264/338; 523/106; 427/133

(58) Field of Classification Search ............... 264/1.1, 264/2.5, 338, 337; 523/106; 427/133
See application file for complete search history.

(56) References Cited

U.S. PATENT DOCUMENTS

| | | | |
|---|---|---|---|
| 2,089,033 A | 8/1937 | Miller | |
| 2,965,946 A | 12/1960 | Sweet et al. | |
| 3,056,166 A | 10/1962 | Weinberg | |
| 3,077,005 A | 2/1963 | Sokol | |
| 3,212,097 A | 10/1965 | Adler | |
| 3,337,659 A | 8/1967 | Grandperret | |
| 3,404,861 A | 10/1968 | Ewer | |
| 3,422,168 A | 1/1969 | Bowser | |
| 3,423,488 A | 1/1969 | Bowser | |
| 3,537,137 A | 11/1970 | Lancesseur | |
| 3,660,545 A | 5/1972 | Wichterle | |
| 3,673,055 A | 6/1972 | Sheld | |
| 3,691,263 A | 9/1972 | Stoy et al. | |
| 3,761,208 A | 9/1973 | Boudet et al. | |
| 3,821,333 A | 6/1974 | Goodwin et al. | |
| 3,835,588 A | 9/1974 | Whitham | |
| 3,871,803 A | 3/1975 | Beattie | |
| 3,881,683 A | 5/1975 | Whitney | |
| 3,894,710 A | 7/1975 | Sarofeen | |
| 3,915,609 A | 10/1975 | Robinson | |
| 3,935,292 A | 1/1976 | Okubo et al. | |
| 4,091,057 A | 5/1978 | Weber | |
| 4,103,992 A | 8/1978 | Breger et al. | |
| 4,121,896 A | 10/1978 | Shepherd | |
| 4,150,073 A | 4/1979 | Neefe | |
| 4,159,292 A | 6/1979 | Neefe | |
| 4,197,266 A | 4/1980 | Clark et al. | |
| 4,208,364 A | 6/1980 | Shepherd | |
| 4,284,591 A | 8/1981 | Neefe | |
| 4,311,654 A | 1/1982 | Blandin | |
| 4,390,482 A | 6/1983 | Feurer | |
| 4,419,463 A | 12/1983 | Atkinson et al. | |
| 4,495,313 A | 1/1985 | Larsen | |
| 4,530,914 A | 7/1985 | Ewen et al. | |
| 4,534,916 A | 8/1985 | Wichterle | |
| 4,540,534 A | 9/1985 | Grendol | |
| 4,565,348 A | 1/1986 | Larsen | |
| 4,622,347 A | 11/1986 | Fudge | |
| 4,640,489 A | 2/1987 | Larsen | |
| 4,661,573 A | 4/1987 | Ratkowski et al. | |
| 4,686,267 A | 8/1987 | Ellis et al. | |
| 4,780,515 A | 10/1988 | Deichert | |
| 4,806,287 A | 2/1989 | Sulc et al. | |
| 4,882,238 A | 11/1989 | Yoshioka et al. | |
| 4,957,663 A | 9/1990 | Zwiers et al. | |
| 4,983,332 A | 1/1991 | Hahn et al. | |
| 5,034,461 A | 7/1991 | Lai et al. | |
| 5,070,169 A | 12/1991 | Robertson et al. | |
| 5,070,215 A | 12/1991 | Bambury et al. | |
| 5,096,626 A | 3/1992 | Takamizawa et al. | |
| 5,145,819 A | 9/1992 | Winter et al. | |
| 5,158,718 A | 10/1992 | Thakrar et al. | |
| 5,160,749 A | 11/1992 | Fogarty | |
| 5,260,000 A | 11/1993 | Nandu et al. | |
| 5,271,875 A | 12/1993 | Appleton et al. | |
| 5,352,714 A | 10/1994 | Lai et al. | |
| 5,417,557 A | 5/1995 | Ross et al. | |
| 5,426,158 A | 6/1995 | Mueller et al. | |
| 5,449,729 A | 9/1995 | Lai | |
| 5,466,147 A | 11/1995 | Appleton et al. | |

(Continued)

FOREIGN PATENT DOCUMENTS

CA         2400437 A      8/2001

(Continued)

*Primary Examiner*—Fred M Teskin

(57) ABSTRACT

This invention describes molds made from alicyclic co-polymers that are useful in the production of contact lenses and methods for their use.

7 Claims, No Drawings

U.S. PATENT DOCUMENTS

| | | |
|---|---|---|
| 5,480,946 A | 1/1996 | Mueller et al. |
| 5,540,410 A | 7/1996 | Lust et al. |
| 5,578,332 A | 11/1996 | Hamilton et al. |
| 5,629,398 A * | 5/1997 | Okamoto et al. ............ 526/281 |
| 5,674,557 A | 10/1997 | Widman et al. |
| 5,690,865 A | 11/1997 | Kindt-Larsen et al. |
| 5,779,943 A | 7/1998 | Enns et al. |
| 5,820,895 A | 10/1998 | Widman et al. |
| 5,843,346 A * | 12/1998 | Morrill ...................... 264/2.5 |
| 5,846,896 A | 12/1998 | Ewen |
| 5,849,209 A | 12/1998 | Kindt-Larsen et al. |
| 5,952,444 A | 9/1999 | Ayama |
| 5,962,548 A | 10/1999 | Vanderlaan et al. |
| 5,965,631 A | 10/1999 | Nicolson et al. |
| 5,972,251 A | 10/1999 | Shannon |
| 5,975,694 A | 11/1999 | Vayntraub |
| 5,975,875 A | 11/1999 | Crowe, Jr. et al. |
| 5,977,035 A | 11/1999 | Sugiura et al. |
| 5,981,675 A | 11/1999 | Valint, Jr. et al. |
| 5,997,881 A | 12/1999 | Powell et al. |
| 6,153,715 A | 11/2000 | Nakamura et al. |
| 6,551,531 B1 * | 4/2003 | Ford et al. .................... 264/2.5 |
| 6,582,631 B1 | 6/2003 | Shepard |
| 6,602,930 B2 | 8/2003 | Imafuku |
| 2002/0003315 A1 | 1/2002 | Ayyagari |
| 2002/0091174 A1 | 7/2002 | Houston et al. |
| 2003/0052424 A1 | 3/2003 | Turner et al. |
| 2004/0044106 A1 | 3/2004 | Portnoy et al. |

FOREIGN PATENT DOCUMENTS

| | | |
|---|---|---|
| EP | 0423998 A | 4/1991 |
| EP | 0 451 858 A2 | 10/1991 |
| EP | 0 576 970 A1 | 1/1994 |
| EP | 0 588 208 A2 | 3/1994 |
| EP | 0 677 373 B1 | 10/1995 |
| EP | 0 686 484 A2 | 12/1995 |
| EP | 0 992 516 A2 | 4/2000 |
| GB | 2005280 * | 4/1979 |
| GB | 2005280 A | 4/1979 |
| JP | 3-206418 | 9/1991 |
| JP | 3-294818 | 12/1991 |
| JP | 8-25378 | 7/1994 |
| JP | 2001-121557 A | 5/2001 |
| WO | 94/07684 A1 | 4/1994 |
| WO | 94/12568 A1 | 6/1994 |
| WO | 96/31791 A1 | 10/1996 |
| WO | 96/31792 A1 | 10/1996 |
| WO | 97/46617 A1 | 12/1997 |
| WO | 99/47344 A2 | 9/1999 |
| WO | 00/25916 A1 | 5/2000 |
| WO | 00/76738 A1 | 12/2000 |
| WO | 02/057837 A | 7/2002 |
| WO | 02/057838 A | 7/2002 |

* cited by examiner

MOLDS FOR PRODUCING CONTACT LENSES

RELATED APPLICATIONS

This application is a divisional application of U.S. patent application Ser. No. 11/522,230, filed on Sep. 15, 2006 now abandoned, which is a continuation-in-part of U.S. patent application Ser. No. 10/639,823, filed Aug. 13, 2003 (now abandoned), which is a continuation-in-part of U.S. patent application Ser. No. 10/395,755 filed Mar. 24, 2003 (now abandoned), which is a continuation-in-part of U.S. patent application Ser. No. 10/222,373 filed Aug. 16, 2002 (now abandoned).

This invention describes molds that are useful in the production of contact lenses and methods for their use.

BACKGROUND

Contact lenses have been used commercially to improve vision since the 1950s. The first contact lenses were made of hard materials. Although these lenses are currently used, they are not suitable for all patients due to their poor initial comfort and their relatively low permeability to oxygen. Later developments in the field gave rise to soft contact lenses, based upon hydrogels, which are extremely popular today. These lenses have higher oxygen permeability and are often more comfortable to wear than contact lenses made of hard materials. Unlike hard lenses that are manufactured by lathing hard pieces of plastic, malleable soft contact lenses are often manufactured by forming the lens using a two part mold where each half has topography consistent with the desired final lens. Examples of such molds and their methods of production may be found in U.S. Pat. Nos. 4,565,348, 4,640,489, 4,495,313, JP 08025378, and JP 0726644 which are hereby incorporated by reference in their entirety.

These two part molds contain a male member whose convex surface corresponds to the back curve of a finished lens and a female member whose concave surface corresponds to the front curve of a finished lens. To prepare lenses using these molds, an uncured lens formulation is placed between the concave and convex surfaces of the mold halves and subsequently cured. The cured lens and the mold are subsequently treated with a liquid medium in order to release the cured lens from the surface of the mold. Although this is a process is straightforward, there are a number requirements that must be satisfied in order to produce a useable lens. First the material from which the mold is made must have properties that are chemically compatible with the uncured lens formulation. Second, the mold material must be able to withstand the curing conditions and be compatible with such conditions. For example, lenses may be cured by either or both heat and light. If a lens is cured by transmitting light to the uncured polymer, it is important that the lens mold permit the transmission of light at the appropriate wavelength. Third, the mold material must not stick to the cured lens to a degree that prevents release of the cured lens. Often the lenses are produced in a manufacturing environment where it is important for the lenses to removably adhere to the same said of the lens mold upon separation in a repeatable and predictable fashion. Therefore, the selection of appropriate materials to make the molds continues to be a subject of concern to those who produce soft contact lenses.

Others have used materials such as polypropylene, polystryene, polyethylene, polymethyl methacrylates, and modified polyolefins containing an alicyclic moiety in the main chain to prepare two part lens molds. Although these materials are useful, with discovery of different lens formulations, particularly silicone hydrogel lens formulations, other useful mold materials are needed.

Further, new developments in the field have led to contact lenses made from hydrogels and silicone hydrogels that are coated with polymers to improve the comfort of the lenses. Often lenses are coated by treating the cured lenses with a polymer. Recently polymer coated lenses have been produced by coating the surfaces of a two part mold with a polymer, adding an uncured formulation to the coated lens mold, curing the lens, and subsequently releasing the cured lens from the mold where the surface of said cured lens is coated with the polymer that was originally adhered to the surface of the mold. This process is described in further detail in U.S. patent application Ser. No. 09/921,192, filed on Aug. 8, 2001, currently pending, and entitled "Method for Correcting Articles by Mold Transfer," which is hereby incorporated by reference in its entirety. When using this method of coating a lens, the choice of mold material is even more critical than when one is producing an uncoated lens.

Therefore, there remains an unmet need to produce lens molds that may be used to produce many different types of soft contact lenses. It is this need that the following invention fills.

DETAILED DESCRIPTION OF THE INVENTION

This invention includes a mold for making a lens comprising, consisting essentially of, or consisting of an alicyclic co-polymer wherein said alicyclic co-polymer comprises, consists essentially of, or consists of at least two alicyclic monomers of different chemical structures. As used herein "lens" refers to any ophthalmic device that resides in or on the eye. These devices can provide optical correction or may be cosmetic. The term lens includes but is not limited to soft contact lenses, intraocular lenses, overlay lenses, ocular inserts, and optical inserts. The preferred lenses of the invention are soft contact lenses are made from silicone elastomers or hydrogels, which include but are not limited to silicone hydrogels, and fluorohydrogels. Soft contact lens formulations are disclosed in U.S. Pat. No. 5,710,302, WO 9421698, EP 406161, JP 2000016905, U.S. Pat. No. 5,998,498, U.S. patent application Ser. No. 09/957,299 filed on Sep. 20, 2001, granted as U.S. Pat. No. 6,943,203 on Sep. 13, 2005. U.S. patent application Ser. No. 09/532,943 (now abandoned), U.S. Pat. No. 6,087,415, U.S. Pat. No. 5,760,100, U.S. Pat. No. 5,776,999, U.S. Pat. No. 5,789,461, U.S. Pat. No. 5,849,811, and U.S. Pat. No. 5,965,631. Further polymers that may be used to form soft contact lenses are disclosed in the following U.S. Pat. Nos. 6,419,858; 6,308,314; and 6,416,690. The foregoing references are hereby incorporated by reference in their entirety. The particularly preferred lenses of the inventions are etafilcon A, genfilcon A, lenefilcon A, polymacon, acquafilcon A, balafilcon A, lotrafilcon A, galyfilcon A, senofilcon A, silicone hydrogels as prepared in U.S. Pat. No. 5,998,498, U.S. patent application Ser. No. 09/532,943 (now abandoned), a continuation-in-part of U.S. patent application Ser. No. 09/532,943 (now abandoned), filed on Aug. 30, 2000, U.S. patent Ser. No. 09/957,299 filed on Sep. 20, 2001, granted as U.S. Pat. No. 6,943,203 on Sep. 13, 2005, soft contact lenses as prepared in U.S. Pat. App. No. 60/318,536 (now abandoned), entitled Biomedical Devices Containing Internal Wetting Agents," filed on Sep. 10, 2001 and its non-provisional counterpart of the same title, filed on Sep. 6, 2002, U.S. Pat. No. 6,087,415, U.S. Pat. No. 5,760,100, U.S. Pat. No. 5,776,999, U.S. Pat. No. 5,789,461, U.S. Pat. No. 5,849,811, and U.S. Pat. No. 5,965,631. These patents (and applications) as well as all other patent disclosed in this application are hereby incorporated by reference in their entirety.

As used herein, the term "alicyclic monomers" refers to polymerizable compounds having at least one saturated carbocyclic ring therein. The saturated carbocyclic rings may be substituted with one or more members of the group consisting of hydrogen, $C_{1-10}$alkyl, halogen, hydroxyl, $C_{1-10}$alkoxycarbonyl, $C_{1-10}$alkoxy, cyano, amido, imido, silyl, and substituted $C_{1-10}$alkyl where the substituents are selected from one or more members of the group consisting of halogen, hydroxyl, $C_{1-10}$alkoxycarbonyl, $C_{1-10}$alkoxy, cyano, amido, imido, and silyl. Examples of alicyclic monomers include but are not limited to polymerizable cyclobutanes, cyclopentanes, cyclohexanes, cycloheptanes, cyclooctanes, biscyclobutanes, biscyclopentanes, biscyclohexanes, biscycloheptanes, biscyclooctanes, and norbornanes. It is preferred that the at least two alicyclic monomers be polymerized by ring opening metathesis followed by hydrogenation. Since co-polymers are costly, it is preferable that the molds made from these co-polymers may be used several times to prepare lenses instead of once which is typical. For the preferred molds of the invention, they may be used more than once to produce lenses.

More particularly, examples of alicyclic monomer containing saturated carbocyclic rings include but are not limited to the following structures

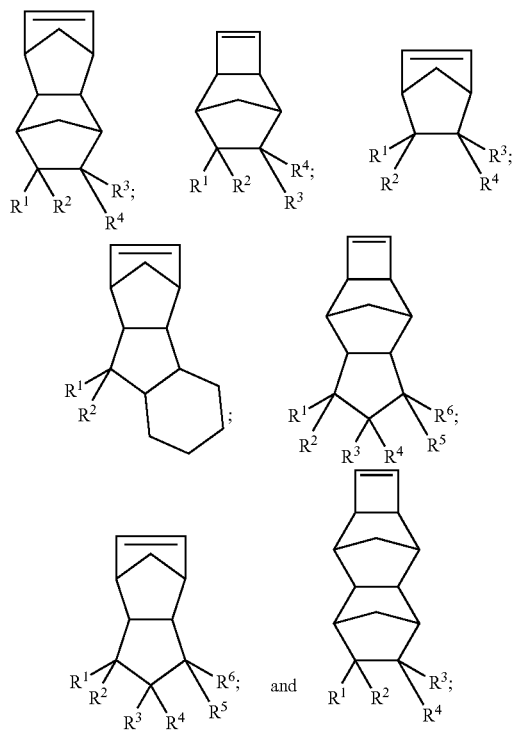

wherein $R^{1-6}$ are independently selected from one or more members of the group consisting of hydrogen, $C_{1-10}$alkyl, halogen, hydroxyl, $C_{1-10}$alkoxycarbonyl, $C_{1-10}$alkoxy, cyano, amido, imido, silyl, and substituted $C_{1-10}$alkyl where the substituents selected from one or more members of the group consisting of halogen, hydroxyl, $C_{1-10}$alkoxycarbonyl, $C_{1-10}$alkoxy, cyano, amido, imido and silyl. Further two or more of $R^{1-6}$ may be taken together to form an unsaturated bond, a carbocyclic ring, a carbocyclic ring containing one or more unsaturated bonds, or an aromatic ring. The preferred $R^{1-6}$ is selected from the group consisting of $C_{1-10}$alkyl and substituted $C_{1-10}$alkyl where the substituents are selected from the group consisting of halogen, hydroxyl, $C_{1-10}$alkoxycarbonyl, $C_{1-10}$alkoxy, cyano, amido, imido and silyl.

The alicyclic co-polymers consist of at least two different alicyclic monomers. The preferred alicyclic co-polymers contain two or three different alicyclic monomers, selected from the group consisting of

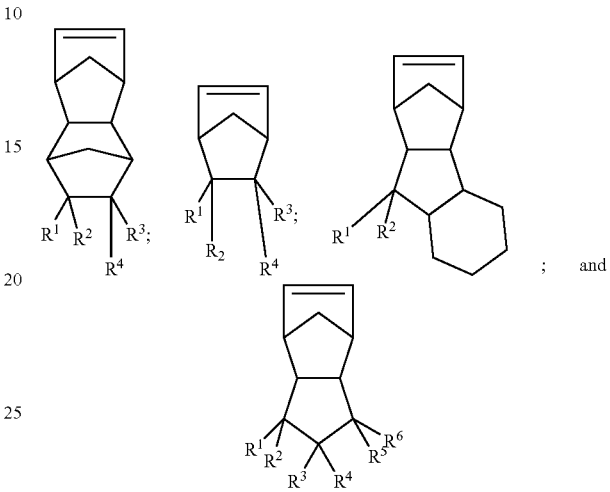

; and

The particularly preferred alicyclic co-polymer contains two different alicyclic monomers where the generic structure of the saturated carbocyclic rings of the alicyclic monomers are of the formula

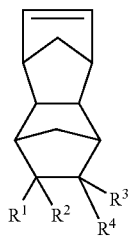

and $R^1$-$R^4$ are $C_{1-10}$alkyl.

Typically the surface energy of the alicyclic co-polymer is between 30 and 45 dynes/cm at 25° C. The more particularly preferred alicyclic co-polymer contains two different alicyclic monomers and is sold by Zeon Chemicals L.P. under the tradename ZEONOR. There are several different grades of ZEONOR, having of glass transition temperatures from 105-160° C. The particularly preferred ZEONOR, is ZEONOR 1060R, which according the to the manufacturer, ZEON Chemicals L.P. has an melt flow rate ("MFR") range of 11.0 grams/10 minutes to 18.0 grams/10 minutes (as tested JISK 6719 (230° C.)), a specific gravity ($H_2O$=1) of 1.01 and a glass transition temperature of 105° C.

As used here, the term "mold" refers to a rigid object that may be used to form lenses from uncured formulations. The preferred molds are two part molds as described above, where either the front curve or the back curve of the mold is made of the alicyclic co-polymers of the invention and the other curve is made of polypropylene. The preferred polypropylenes are those that have a melt flow of less that 21 g/10 min. Examples of polypropylene include but are not limited to metallocene catalyzed polypropylene that is nucleated and clarified, such as but not limited to Achieve 1615, or Achieve 1654 from Exxon and ATOFINA EOD 00-11. Further examples of polypropylene include Ziegler-Natta catalyst based polypropylenes, such as but not limited to Exxon 9544 MED, Exxon 49486-002, Atofina 3620Wz, Atofina NO 3105, having a melt flow of 12 g/10 min, <21 g/10 min; 12 g/10 min; and 18 g/10 min respectively. The preferred method of making the molds of the invention is by injection molding using known techniques, but the molds could be made by other techniques lathing, diamond turning, or laser cutting.

Typically lenses are formed on at least one surface of both mold parts. However, if need be one surface of the lenses may be formed from a mold and the other surface could be formed using a lathing method, or other methods.

Aside from the alicyclic co-polymers, the molds of the invention may contain additives that facilitate the separation of the lens forming surfaces, reduce the adhesion of the cured lens to the molding surface, or both. For example additives such as metal or ammonium salts of stearic acid, amide waxes, polyethylene or polypropylene waxes, organic phosphate esters, glycerol esters or alcohol esters may be added to alicyclic co-polymers prior to curing said polymers to form a mold. Examples of such additives include but are not limited to Dow Siloxane MB50-321 (a silicone dispersion), Nurcrel 535 & 932 (ethylene-methacrylic acid co-polymer resin Registry No. 25053-53-6), Erucamide (fatty acid amide Registry No. 112-84-5), Oleamide (fatty acid amide Registry No. 301-02-0), Mica (Registry No. 12001-26-2), Atmer 163 (fatty alkyl diethanolamine Registry No. 107043-84-5), Pluronic (polyoxypropylene-polyoxyethylene block co-polymer Registry No. 106392-12-5), Tetronic (alkyoxylated amine 110617-70-4), Flura (Registry No. 7681-49-4), calcium stearate, zinc stearate, Super-Floss anti block (slip/anti blocking agent, Registry No. 61790-53-2), Zeospheres anti-block (slip/anti blocking agent); Ampacet 40604 (fatty acid amide), Kemamide (fatty acid amide), Licowax fatty acid amide, Hypermer B246SF, XNAP, polyethylene glycol monolaurate (anti-stat) epoxidized soy bean oil, talc (hydrated Magnesium silicate), calcium carbonate, behenic acid, pentaerythritol tetrastearate, succinic acid, epolene E43-Wax, methyl cellulose, cocamide (anti-blocking agent Registry No. 61789-19-3), poly vinyl pyrrolidinone (360,000 MW) and the additives disclosed in U.S. Pat. No. 5,690,865 which is hereby incorporated by reference in its entirety. The preferred additives are polyvinyl pyrrolidinone, zinc stearate and glycerol mono stearate, where a weight percentage of additives based upon the total weight of the polymers is about 0.05 to about 10.0 weight percent, preferably about 0.05 to about 3.0, most preferably about 2.0 weight percent.

In addition to additives, the separation of the lens forming surfaces may be facilitated by applying surfactants to the lens forming surfaces. Examples of suitable surfactants include Tween surfactants, particularly Tween 80 as described in U.S. Pat. No. 5,837,314 which is hereby incorporated by reference in its entirety. Other examples of surfactants are disclosed in U.S. Pat. No. 5,264,161 which is hereby incorporated by reference in its entirety.

Still further, in addition to the alicyclic co-polymers, the molds of the invention may contain other polymers such as polypropylene, polyethylene, polystyrene, polymethyl methacrylate, and modified polyolefins containing an alicyclic moiety in the main chain. For example, a blend of the alicyclic co-polymers and polypropylene (metallocene catalyst process with nucleation, where ATOFINA EOD 00-11) may be used, where the ratio by weight percentage of alicyclic co-polymer to polypropylene ranges from about 99:1, to about 20:80 respectively. This blend can be used on either or both mold halves, where it is preferred that this blend is used on the back curve and the front curve consists of the alicyclic co-polymers.

Further this invention includes a method of making a lens comprising, consisting essentially of, or consisting of 1) dispensing an uncured lens formulation onto a mold surface comprising, consisting essentially of, or consisting of, an alicyclic co-polymer wherein said alicyclic co-polymer comprises, consists essentially of, or consists of at least two alicyclic monomers of different chemical structures, and 2) curing said lens formulation under suitable conditions. The terms lenses, alicyclic monomers, and molds have their aforementioned meaning and preferred ranges.

As used herein, the term "uncured" refers to the physical state of a lens formulation prior to final curing to form a lens. Some lens formulations contain mixtures of monomers which are cured only once. Other lens formulations contain monomers, partially cured monomers, macromers and other components. For examples of such partially cured formulations are disclosed in U.S. Pat. Nos. 6,419,858; 6,308,314; and 6,416,690. This invention will be useful these formulations among others.

As used herein, the phrase "curing under suitable conditions" refers to any of the known methods of curing lens formulations, such as using light, heat, and the appropriate catalysts to produce a cured lens. Examples of such curing conditions may be found in the soft lens formulation references listed herein.

Still further, the invention includes a lens produced by a method comprising, consisting essentially of, or consisting of 1) dispensing an uncured lens formulation onto a surface of a mold comprising, consisting essentially of, or consisting of, an alicyclic co-polymer wherein said alicyclic co-polymer comprises, consists essentially of, or consists of at least two alicyclic monomers of different chemical structures and 2) curing said lens formulation under suitable conditions. The terms lens, alicyclic monomers, uncured, and molds have their aforementioned meaning and preferred ranges.

Yet still further, the invention includes a mold comprising, consisting essentially of, or consisting of, an alicyclic co-polymer and at least one lens forming surface
wherein said alicyclic co-polymer comprises, consists essentially of, or consists of at least two alicyclic monomers of different chemical structures, and
wherein said at least one lens forming surface comprises, consists essentially of, or consists of a coating effective amount of a high molecular weight coating composition.

The terms lens, alicyclic monomers, uncured, and molds have their aforementioned meaning and preferred ranges.

As used herein "lens forming surface" means the surface that is used to mold the lens. Such surface has an optical quality surface finish, meaning that it is sufficiently smooth so that a lens surface formed by the polymerization of a lens forming material in contact with the molding surface is optically acceptable. Further said surface has a geometry that is necessary to impart to the lens surface the desired optical characteristics, including without limitation, spherical aspherical and cylinder power, wave front aberration correction, corneal topography correction and the like as well as combinations thereof.

The term "high molecular weight" means an average molecular weight ("MW") sufficiently high so as to avoid dissolution of the coating into the lens formulation or the mold material. For purposes of the invention, preferably the molecular weight is determined using gel permeation chromatography ("GPC") with a light scattering detector and a high sensitivity refractive index detector, for example model PL-RI available from Polymer Labs. The GPC is performed using a phenogel 5 μm linear column equipped with a guard column of the same components and a solution of 0.5 weight percent lithium bromide in dimethyl formamide as the eluent. Flow rates are 0.5 mL per minute with injection volumes from about 10 to about 20 μL. The precise MW used will depend upon the coating selected and the monomer mixture used. In a preferred embodiment, the MW of the coating is greater than about 300 kD.

"Coating compositions" useful in this invention include a wide variety of known monomers and polymers. Preferred are poly(vinyl alcohol), polyethylene oxide, poly(2-hydroxyethyl methacrylate), poly(methyl methacrylate), poly(acrylic acid), poly(methacrylic acid), poly(maleic acid), poly(itaconic acid), poly(acrylamide), poly(methacrylamide), poly(dimethylacrylamide), poly(glycerol methacrylate), polystyrene sulfonic acid, polysulfonate polymers, poly(vinyl pyrrolidone), carboxymethylated polymers, such as carboxymethylcellulose, polysaccharides, glucose amino glycans, polylactic acid, polyglycolic acid, block or random copolymers of the aforementioned, and the like, and mixtures thereof. Preferably, poly(2-hydroxyethyl methacrylate), poly(vinyl pyrrolidone), poly(acrylic acid), poly(methacrylic acid), poly(meth)acrylamide, or poly(acrylamide) is used. More preferably, poly(2-hydroxyethyl methacrylate) is used.

Aside from the high molecular weight polymers, the coating composition may include a low boiling point (less than about 100° C.) solvent and a high boiling point, (greater than about 100° C.) solvent. Suitable low boiling solvents include, without limitation, acetone, chloroform, and alcohols such as methanol, ethanol, isopropanol, tert-butanol, and the like. Useful high boiling solvents include, without limitation, methyl-, ethyl-, and isopropyl lactate, ethylene and (poly) ethylene glycol, propylene glycol, n-methylpyrrolidone, dimethyl formamide, tetrahydrogeraniol, 1-butanol, 1-pentanol, 1-hexanol, 1-octanol, 3-methyl-3-pentanol, dimethyl-3-octanol, 3-methoxy-1-butanol, 1,2 and 1,4-butanediol, 1,3-hexanediol, water, and the like. Typically, the ratio of the low to high boiling solvent will be about 10:90 to 90:10 when coating between 15 and 45 degrees C. When the coating composition is applied using spin coating (discussed below), the coating composition contains either or both low boiling and high boiling solvents.

Additionally, the coating composition may include at least one surfactant. Suitable surfactants include, without limitation, anionic surfactants, such as carboxylic acid salts, sulfonic acid salts, sulfuric acid salts, phosphoric and polyphosphoric acid esters, cationic surfactants, such as long chain amines and their salts, diamines and polyamines and their salts, quarternary ammonium salts, amine oxides, nonionic surfactants, such as polyoxyethylenated alkylphenols, alkyl phenol ethoxylates, polyoxyethylenated straight chain alcohols, polyethoxylated polyoxypropylene glycols, polyethoxylated polydimethylsiloxane copolymers, fluorinated alkane ethoxylate copolymers, and long chain carboxylic acid esters, zwitterionic surfactants, such as pH-sensitive and pH insensitive surfactants, and the like, and combinations thereof. The specific type and amount of surfactants used will depend upon the other components of the coating composition and the molding surface used. Typically, greater than or equal to about 0.001 weight percent and less than or equal to about 5 weight percent based on the total weight of the coating composition will be used.

The coating composition may be applied to the molding surface by any suitable method including, but not limited to, compression, swabbing, spray coating, ink jet printing, aerosolization, nebulization, dip coating, spin coating, and the like and combinations thereof. Preferably, spin coating is used. Also, preferably, the coating is dried, or rendered non-tacky, prior to its use for forming lenses. Drying may be carried out using any suitable method, but preferably is carried out at temperatures up to about the glass transition temperature ("Tg") of the mold material in air or under vacuum followed by equilibration under a blanket of nitrogen at any temperature up to about the Tg of the mold material. During the vacuum exposure process, cold traps or other filters preferably are used to prevent contamination of the mold.

In a spin coating method, the coating composition preferably has a lower surface tension than that of the molding surface's surface energy. More preferably, the surface tension of the coating composition is greater than about 3 dynes/cm below that of the surface energy of the molding surface to which it is applied when measured at the coating application temperature. Most preferably, the surface tension of the coating composition is more than 8 dynes/cm below that of the surface energy of the molding surface.

In a preferred spin coating method for use in forming contact lenses, spin coating is used to deposit a coating of a dry thickness of about 5 to about 70 nm onto a molding surface of a mold. If the surface tension of the coating differs from the surface energy of the mold by greater than about 8 dynes/cm when measured at the coating application temperature, a suitable spin profile of at least about 6,000 and no more than about 8,000 RPM using at least about 2 and no more than about 20 μl of coating composition and spinning for at least about 3 sec. If the surface tension difference is less than about 8 dynes/cm, the mold is spun up to at least about 3,000 and no more than about 5,000 RPM using at least about 2 and no more than about 10 μl of coating composition and then the mold is spun up to at least about 7,000 and more than about 10,000 RPM for at least about 3 seconds prior to stopping.

Any excess coating accumulating at the mold edges must be removed and removal may be carried out by any convenient method including, without limitation, swabbing the excess, removing the excess using vacuum, solvent, washing or pressurized air jet. Preferably, the excess is removed using an air jet. In using the air-jet, it is critical that spinning is started prior to the jet being turned on and, preferably, the air jet pressure is equal to or greater than about 3 psi.

The term "coating effective amount" refers to the thickness and the roughness of the coating composition on the lens forming surface. For hydrated contact lenses, preferably a peak-to-peak surface roughness of the hydrated lens is less than about 500 nm is preferable. Thus, by coating effective amount is meant an amount of the coating composition sufficient to provide a dry film thickness of the coating composition on the lens forming surface that will result in a hydrated article with an acceptable surface roughness and for contact lenses preferably a hydrated lens peak-to-peak surface roughness of less than about 500 nm. More preferably, the amount of coating composition used is an amount sufficient to produce a dry film thickness of at least about 5 nm and no more than about 70 nm, preferably at least about 5 nm and no more than about 50 nm, more preferably at least about 20 nm and no more than about 40 nm. Still more preferably said coating effective amount covers the entire or substantially the entire lens forming surface.

Coating additives may be added to the high molecular weight coating compositions of the invention. Coating additives may include but are not limited to tints, pigments, and antimicrobial compositions. Examples of antimicrobial compositions that may be used in this manner are disclosed in the following U.S. patents and applications which are hereby incorporated by reference in their entirety, U.S. Pat. Nos. 6,218,492; 6,248,811; 6,160,056 and U.S. patent application Ser. No. 10/028,400, currently pending, filed on Dec. 20, 2001, entitled Antimicrobial Contact Lenses and Methods for Their Production; and Ser. No. 10/029,526 (now abandoned), filed on Dec. 21, 2001, entitled Antimicrobial Contact Lenses and Methods of Use.

Still, yet further, the invention includes a method for making a coated lenses comprising, consisting essentially of, or consisting of (1) coating at least one lens forming surface of a lens mold with a coating effective amount of a high molecular weight coating composition wherein said lens mold comprises an alicyclic co-polymer and at least one lens forming surface;

wherein said alicyclic co-polymer comprises, consists essentially of, or consists of at least two alicyclic monomers of different chemical structures;

(2) dispensing an uncured lens formulation onto said at least one lens forming surface; and (3) curing said lens formulation and said coating composition using a dwell time of less than about 5 minutes and under conditions suitable to form a coated lens.

The terms lens, alicyclic monomers, uncured, molds, high molecular weight, coating composition, and coating effective amount all have their aforementioned meaning and preferred ranges.

In order to illustrate the invention the following examples are included. These examples do not limit the invention. They are meant only to suggest a method of practicing the invention. Those knowledgeable in the production of lenses as well as other specialties may find other methods of practicing the invention. However, those methods are deemed to be within the scope of this invention.

EXAMPLES

In the examples, the following abbreviations are used:

| | |
|---|---|
| BC | back curve |
| Blue-HEMA | product of the base-promoted displacement of one chloride of Reactive Blue # 4 dye by hydroxyethyl methacrylate. |
| CIP | Pre-Cure |
| CGI 1850 | 1:1 (wt) blend of 1-hydroxycyclohexyl phenyl ketone and bis(2,6-dimethoxybenzoyl)-2,4,4-trimethylpentyl phosphine oxide |
| CGI 819 | Bis (2,4,6-trimethylbenzolyl)phenyl phosphine oxide |
| D3O | 3,7-dimethyl-3-octanol |
| Darocur 1173 | UV photo initiator Ciba Speciality Chemicals |
| DMA | N,N-dimethylacrylamide |
| FC | front curve |
| ATOFINA EOD 00-11 | A metallocene and isotactic polypropylene having a melt flow of 14-18 g/10 minutes, ASTM D1238 |
| HEMA | 2-hydroxyethyl methacrylate |
| IPA | isopropanol |
| Macromer 2 | the reaction product of described in the examples of U.S. patent application Ser. No. 10/028,400 currently pending, filed on Dec. 20, 2001 and entitled Antimicrobial Contact Lenses and Methods for Their Production |
| mPDMS | monomethacryloxypropyl terminated polydimethylsiloxane |
| m-PDMS-OH | mono-(3-methacryloxy-2-hydroxypropyloxy)propyl terminated, mono-butyl terminated polydimethylsiloxane (MW 1100) |
| Norbloc | 2-(2'-hydroxy-5-methacrylyloxyethylphenyl)-2H-benzotriazole |
| PVP | poly(N-vinyl pyrrolidone) |
| poly-Hema | poly hydroxy ethylmethacrylate having a molecular weight of greater than 1 MM Dalton |
| SIGMA | 2-propenoic acid, 2-methyl-,2-hydroxy-3-[3-[1,3,3,3-tetramethyl-1-[(trimethylsilyl)oxy]disiloxanyl]propoxy]propyl ester |
| TEGDMA | tetraethyleneglycol dimethacrylate |
| TrEGDMA | triethyleneglycol dimethacrylate |
| TBACB | tetrabutyl ammonium-m-chlorobenzoate |
| THF | tetrahydrofuran |
| TMI | 3-isopropenyl-α,α-dimethylbenzyl isocyanate |
| TRIS | 3-methacryloxypropyltris (trimethylsiloxy) silane |

Example 1

Preparation of Molds with Alicyclic Co-Polymers

Pellets of the alicyclic co-polymer ZEONOR® 1060R were placed in a de-humidifying dryer at 90° C. for approximately one to four (1-4) hours. The material was subsequently heated and purged through an injection molding machine using the techniques generally described in INJECTION MOLDING HANDBOOK, edited by Dominick & Donald Rosato, Published by Nan Nostrand Reinhold Company, 1986. Approximately three (3) pounds of material was purged and molded within 10-15 minutes to give front curves and back curves for lenses having a power of −1.00 D. Normal usable lens molds were recovered and used to make lenses following the procedure of Example 2.

Example 2

The formulation listed in Table A was used to prepare silicone hydrogel lenses. Further details on the precise mixing procedure is disclosed in U.S. patent application Ser. No. 09/957,299 filed on Sep. 20, 2001, granted as U.S. Pat. No. 6,943,203 on Sep. 13, 2005.

TABLE A

| | Weight Percent |
|---|---|
| Macromer 2 | 17.98 |
| TRIS | 14.00 |
| DMA | 26.00 |
| MPDMS | 28.00 |
| TEGDMA | 1.00 |
| HEMA | 5.00 |
| PVP | 5.00 |
| NORBLOC | 2.00 |
| Blue HEMA | 0.02 |
| CGI 1850 | 1.00 |

The remainder of the formulation were additives and diluents. The monomer to diluent ratio was 100:20, the diluent being 3,7-dimethyl-3-octanol. Acetic acid, 1% of the final mix, was used to stabilize the monomer.

The front and back curve molds prepared by the method of Example 1 were coated with a high MW poly-HEMA coating. Approximately 6 microliters of a 1.3% wt percent solution of poly-HEMA in 70:30 ethanol:ethyl lactate was applied onto the front curve mold surface (concave) by spin coating at 8000 rpm for 8 sec. A jet of air was applied to the edge of the spinning part during the last two seconds of the spin cycle to remove the excess coating. Approximately 8.5 microliters of a 1.1% solution of poly-HEMA in 70:30 ethanol:ethyl lactate was applied to the back curve mold surface (convex) by spin coating at 6000 rpm for 2 sec followed by 6 sec at 8000 rpm. A jet of air was applied to the edge of the spinning part during the last two seconds of the spin cycle to remove the excess coating. Lenses were made by dispensing the above lens formulation into the lens molds, closing the parts, precuring under visible lights for 45 sec at 45° C. followed by approximately 7 minutes of cure under visible lights at 70° C. In all cases the precure was begun within 30 sec of lens monomer dose into the mold.

The lenses were tested clinically and were found to be equivalent in on-eye wettability, or tear break-up time, and deposition resistance to ACUVUE® etafilcon A lenses demonstrating that application of the coating to the lens results in a physiological compatible lens.

Example 3

Preparation of Polypropylene Lens Molds

The FC and BC of lens molds were prepared using the method of Example 1 and substituting polypropylene (manufactured by Atofina EOD 00-11) for the alicyclic co-polymer of Example 1.

Example 4

Preparation of Lenses Using the Molds of Example 3

Lenses were made using the formulation and method of Example 2, but substituting the molds of Example 3, for the molds of Example 1. The finished lenses were examined for defects in the coating using a visual inspection apparatus. Defects were discrete areas on the surface of the finished lens where the coating was not applied. The percentage of defects was calculated and recorded in Table B, below. This example demonstrates that molds made from alicyclic co-polymers may be used to produce coated lenses with significantly reduced coating defects.

TABLE B

| Mold Material for the FC and BC | Number of Lenses Examined | Coating Defect Rate |
|---|---|---|
| Example 3 | 1200 | 39.1% |
| Example 3 | 1200 | 45.5% |
| Example 3 | 1200 | 50.0% |
| Example 1 | 1600 | 2.0% |
| Example 1 | 1600 | 6.3% |
| Example 1 | 4800 | 4.4% |
| Example 1 | 400 | 0.3% |

Example 5

Lenses Prepared With Different Mold Materials for the FC and BC

FC and BC molds made by the method of Examples 1 and 3 were used to prepare lenses by the method of Example 2. Dissimilar mold materials were used to make some lenses as per Table C. The coating defect rate was measured as well as the haze The haze values indicated were measured by placing test lenses in saline in a clear cell above a black background, illuminating from below with a fiber optic lamp at an angle 66° normal to the lens cell, and capturing an image of the lens from above with a video camera. The background-subtracted scattered light image was quantitatively analyzed, by integrating over the central 10 mm of the lens, and then compared to a −1.00 diopter CSI Thin lens (commercial lens made by Wesley Jessen 33 East Tower A, Des Planes, Ill.), which is arbitrarily set at a haze value of 100, with no lens set as a haze value of zero. This data shows that the lowest number of defects are produced when the FC and the BC molds were made from an alicyclic co-polymer.

TABLE C

| FC Mold Material | BC Mold Material | CIP Time | Coating Defect Rate | Haze (% CSI) |
|---|---|---|---|---|
| ZEONOR | ZEONOR | 60 | 0.7% | 24.7 |
| ZEONOR | ZEONOR | 30 | 0% | 20.5 |
| ZEONOR | PP | 60 | 1.4% | 31.2 |
| ZEONOR | PP | 30 | 8.5% | 53.8 |

Example 6

Preparation of Lens Molds from Alicyclic Polymer

Pellets of the alicyclic polymer Zeonex® 480R were placed in a de-humidifying dryer at 100° C. for approximately four (4) hours. An attempt was made to form molds using the method of Example 1. Usable lens molds could not be formed with this material. Only tabs of cured materials were recovered and the lens mold cavities were not formed. Increasing the temperature of the molding machine (to the machine's maximum safety level) and the temperature of the mold material did not correct this problem. No usable molds were formed. This example demonstrates the distinction between the successful production of molds made from alicyclic co-polymers and the failure of molds made from alicyclic polymers.

Example 7

Preparation of Blended Molds

An amount of polypropylene (ATOFINA EOD-0011, 50%) was blended with Zeonor 1060 R (50%) in a mixing tumbler and processed for 15 minutes. This mixture was processed in a extrusion or palletizing process to generate a uniform material. The blended material was placed into an injection molding machine and extruded into male and female halves of a lens mold and subsequently cured. The cured molds were placed into a nitrogen environment of 30 minutes before use.

Example 8

Preparation of Silicone Hydrogel Lenses B

The reaction components and diluent (D30) listed in Table D were mixed together with stirring or rolling for at least about 3 hours at about 23° C., until all components were dissolved. The reactive components are reported as weight percent of all reactive components and the diluent is weight percent of final reaction mixture. The reaction mixture was placed into the lens molds of Example 7 and irradiated using Philips TL 20W/03T fluorescent bulbs at 45° C. under N2. The cure conditions in a glove box are at approx 0.2 mW/c2 for about 6.5 minutes, followed by 2.5 mWw/c2 for about 12 min. The oxygen level was <1.5% O2. The molds were opened by hand the lenses were evaluated to determine if the cured lenses remained with the front curve or the back curve of the mold. Table E lists the percentage of Zeonor and polypropylene (pp) in each lens mold half and the number of lenses of Lens Type B which remained with either the front curve or the back curve after they were separated.

TABLE D

| | Lens Type | | | | | | | | | |
|---|---|---|---|---|---|---|---|---|---|---|
| Comp. | B | C | D | E | F | G | H | I | J | K |
| SIGMA | 28 | 30 | 28.6 | 28 | 31 | 32 | 29 | 39.4 | 20 | 68 |
| PVP (K90) | 7 | 10 | 7.1 | 7 | 7 | 7 | 6 | 6.7 | 3 | 7 |
| DMA | 24 | 17 | 24.5 | 23.5 | 20 | 20 | 24 | 16.4 | 37 | 22 |
| mPDMS | 31 | 32 | 0 | 31 | 31 | 34 | 31 | 29.8 | 15 | 0 |
| TRIS | 0 | 0 | 0 | 0 | 0 | 0 | 0 | 0 | 15 | 0 |
| HEMA | 6 | 6 | 6.1 | 6 | 6.5 | 3 | 5.5 | 2.9 | 8 | 0 |
| Norbloc | 2 | 2 | 0 | 2.0 | 2 | 2 | 2 | 1.9 | 0 | 0 |
| CGI 1850 | 0.48 | 1 | 1.02 | 1 | 1 | 1 | 1 | 1 | 1 | 0 |
| TEGDMA | 1.5 | 2 | 1.02 | 1.5 | 1.5 | 1 | 1.5 | 1.9 | 0 | 2 |
| TrEGDMA | 0 | 0 | 0 | 0 | 0 | 0 | 0 | 0 | 1 | 0 |
| Blue HEMA | 0.02 | 0 | 0 | 0 | 0 | 0 | 0 | 0 | 0 | 0 |
| mPDMS-OH | 0 | 0 | 31.6 | 0 | 0 | 0 | 0 | 0 | 0 | 0 |
| Darocur 1173 | 0 | 0 | 0 | 0 | 0 | 0 | 0 | 0 | 0 | 1 |
| D30% | 23 | 26 | 17 | 23 | 23 | 29 | 32 | 28 | 17 | 27 |

TABLE E

| Back Curve | Front Curve | % lenses in FC | Total No. Tested |
|---|---|---|---|
| 5% pp 95% Zeonor | 100% Zeonor | 29 | 24 |
| 25% pp 75% Zeonor | 100% Zeonor | 71 | 24 |
| 35% pp 65% Zeonor | 100% Zeonor | 88 | 24 |
| 35% pp 65% Zeonor | 100% Zeonor | 91 | 32 |
| 40% pp 60% Zeonor | 100% Zeonor | 97 | 32 |
| 40% pp 60% Zeonor | 100% Zeonor | 100 | 24 |
| 45% pp 55% Zeonor | 100% Zeonor | 100 | 32 |
| 50% pp 50% Zeonor | 100% Zeonor | 100 | 32 |
| 75% pp 25% Zeonor | 100% Zeonor | 100 | 32 |

This example illustrates that as the amount of polypropylene in the blend increases, the lenses remain in the front curve upon separation.

What is claimed is:

1. A method for making a coated lenses comprising
   (1) coating at least one lens forming surface of a lens mold with a coating effective amount of a high molecular weight coating composition
   wherein said lens mold comprises an alicyclic co-polymer, polypropylene having a melt flow of less than about 21 g/10 min, and at least one lens forming surface
     wherein said alicyclic co-polymer comprises at least two alicyclic monomers of different chemical structures;
   (2) dispensing an uncured lens formulation onto said at least one lens forming surface; and
   (3) curing said lens formulation and said coating composition using a dwell time of less than about 5 minutes and under conditions suitable to form a coated lens.

2. The method of claim 1 wherein the high molecular weight coating composition comprises poly(vinyl alcohol), polyethylene oxide, poly(2-hydroxyethyl methacrylate), poly(methyl methacrylate), poly(acrylic acid), poly(methacrylic acid), poly(maleic acid), poly(itaconic acid), poly (acrylamide), poly(methacrylamide), poly(dimethylacrylamide), poly(glycerol methacrylate), polystyrene sulfonic acid, polysulfonate polymers, poly(vinyl pyrrolidone), carboxymethylated polymers, such as carboxymethylcellulose, polysaccharides, glucose amino glycans, polylactic acid, polyglycolic acid, block or random copolymers of the aforementioned, and mixtures thereof.

3. The method of claim 1 wherein the high molecular weight coating composition comprises poly(2-hydroxyethyl methacrylate), poly(vinyl pyrrolidone), poly(acrylic acid), poly(methacrylic acid), poly(meth)acrylamide, or poly(acrylamide) and mixtures thereof.

4. The method of claim 1 wherein the lens forming surface of the front curve comprises an alicyclic co-polymer having a MFR of about 11.0 grams/10 minutes to about 18.0 grams/10 minutes, a specific gravity of 1.01 and a glass transition temperature of 105° C. and the lens forming surface of the back curve comprises polypropylene having a melt flow of less than about 21 g/10 min.

5. The method of claim 1 wherein the lens forming surface of the front curve comprises an alicyclic co-polymer having a MFR of about 11.0 grams/10 minutes to about 18.0 grams/10 minutes, a specific gravity of 1.01 and a glass transition temperature of 105° C. and the lens forming surface of the back curve comprises polypropylene having a melt flow of less than about 21 g/10 min and an alicyclic co-polymer having a MFR of about 11.0 grams/10 minutes to about 18.0 grams/10 minutes, a specific gravity of 1.01 and a glass transition temperature of 105° C.

6. The method of claim 5 wherein the ratio of alicyclic co-polymer to polypropylene in the back curve is about 20:80 to about 80:20.

7. The method of claim 5 wherein the ratio of alicyclic co-polymer to polypropylene in the back curve is about 55:45.

* * * * *